(12) United States Patent
Hsu

(10) Patent No.: US 9,204,110 B2
(45) Date of Patent: Dec. 1, 2015

(54) CASINO SYSTEM DISPLAYING INSTANT MONITORING IMAGES

(71) Applicant: Tien-Shu Hsu, Taichung (TW)

(72) Inventor: Tien-Shu Hsu, Taichung (TW)

( * ) Notice: Subject to any disclaimer, the term of this patent is extended or adjusted under 35 U.S.C. 154(b) by 143 days.

(21) Appl. No.: 14/018,221

(22) Filed: Sep. 4, 2013

(65) Prior Publication Data

US 2015/0065239 A1 Mar. 5, 2015

(51) Int. Cl.
*A63F 13/10* (2006.01)
*H04N 7/18* (2006.01)
*G07F 17/32* (2006.01)

(52) U.S. Cl.
CPC ............ *H04N 7/183* (2013.01); *G07F 17/3234* (2013.01)

(58) Field of Classification Search
USPC ................................................ 463/16, 17, 31
See application file for complete search history.

(56) References Cited

U.S. PATENT DOCUMENTS

| 2003/0003997 | A1* | 1/2003 | Vuong et al. | 463/42 |
| 2009/0069090 | A1* | 3/2009 | Moser et al. | 463/42 |
| 2012/0157213 | A1* | 6/2012 | Ruppert et al. | 463/42 |
| 2013/0116032 | A1* | 5/2013 | Lutnick | 463/17 |
| 2014/0011561 | A1* | 1/2014 | Lutnick et al. | 463/17 |

* cited by examiner

*Primary Examiner* — Pierre E Elisca
(74) *Attorney, Agent, or Firm* — Muncy, Geissler, Olds & Lowe, P.C.

(57) ABSTRACT

A casino system displaying instant monitoring images includes a correlation table that can be implemented in a casino management system or a casino monitoring system. The correlation table registers the gambling apparatus and the corresponding monitor lens to establish correlation therebetween. Hence the casino management system requires merely to record the number of the gambling apparatus and occurring time and event type of a corresponding special event to issue a signal to request the casino monitoring system to find out the monitor lens corresponding to the gambling apparatus according to the correlation table and send instant monitoring images captured by the monitor lens to the casino management system. Thus management personnel can instantly get the instant monitoring images of the special event and take suitable actions immediately.

22 Claims, 7 Drawing Sheets

CASINO SYSTEM DISPLAYING INSTANT MONITORING IMAGES

FIELD OF THE INVENTION

The present invention relates to a casino system and particularly to co-processing of casino management and monitoring systems.

BACKGROUND OF THE INVENTION

Please referring to FIGS. 1 and 2, a casino mainly has a plurality of gambling apparatus installed to provide gambling games for players. The gambling apparatus mainly can be divided into a gambling machine 1 (referring to FIG. 1) and a physical table top 2 (referring to FIG. 2) managed by a dealer. The players can play games on both of them.

In order to manage the gambling apparatus, the casino generally sets up a casino management system connected to the gambling apparatus to receive signals from them and also facilitate management thereof. To meet security requirement and ensure smooth operations of the gambling apparatus and get well-informed conditions of all gambling apparatus on the premise of the casino, the casino usually also installs a casino monitoring system. The casino monitoring system generally includes a plurality of monitor lenses 3 and a plurality of monitor screens (not shown in the drawings) corresponding to the monitor lenses 3. The monitor lenses 3 aim to monitor operation of the gambling apparatus (gambling machine 1 or physical table top 2). Depending on actual needs and onsite environmental requirements, the monitor lenses 3 and gambling apparatus can be set up in a one-to-one, multiple-to-one, or one-to-multiple fashion to meet requirement of full scope monitoring. Security personnel can constantly monitor and watch the monitor screens to be instantly informed, of the conditions taking place on the gambling apparatus.

While the aforesaid conventional casino management system and casino monitoring system allow management personnel to get feedback signals from the gambling apparatus about special events happened thereof, to clearly identify the causes of those special events occurred to the gambling apparatus and take suitable actions instantly, onsite image while the special events take place often are needed. However, to find the onsite image the security personnel have to locate the required monitor lenses 3 at the affected gambling apparatus and manually sort, scan and sift the saved monitoring image data. It is a tedious and time-consuming process. Hence unless the special event is very significant, such measure is rarely being taken in practice.

SUMMARY OF THE INVENTION

Therefore the primary object of the present invention is to provide a casino system displaying instant monitoring images of a monitor lens corresponding to a specific gambling apparatus according to requirement to enable management personnel to take necessary actions immediately.

To achieve the foregoing object, the invention is implementable in a casino management system or a casino monitoring system.

When the present invention is implemented on the casino management system, the casino management system is connected to at least one gambling apparatus and a casino monitoring system. The casino monitoring system includes at least one monitor lens to monitor the at least one gambling apparatus. The casino management system includes a correlation table.

The correlation table registers the gambling apparatus and the corresponding monitor lens. When a special event occurs on the gambling apparatus, the casino management system generates an event record which includes the number of the gambling apparatus and occurring time and event type of the special event. According to the correlation table, the casino management system finds out the monitor lens corresponding to the gambling apparatus and issues a signal to request the casino monitoring system to send instant monitoring images captured by the corresponding monitor lens to the casino management system.

When the present invention is implemented on the casino monitoring system, the casino monitoring system is connected to a casino management system to monitor at least one gambling apparatus. The casino monitoring system dudes at least one monitor lens and a correlation table.

The at least one monitor lens monitors the at least one gambling apparatus. The correlation table registers the gambling apparatus and the corresponding monitor lens. When a special event occurs on the gambling apparatus, the casino management system generates an event record which includes the number of the gambling apparatus and occurring time and event type of the special event. The casino management system also issues a signal to request the casino monitoring system to find out the monitor lens corresponding to the gambling apparatus according to the correlation table and send the instant monitoring images captured by the corresponding monitor lens to the casino management system.

Thus, in the invention, through the correlation table registered the gambling apparatus and the corresponding monitor lens, the casino management system, which records the number of the gambling apparatus and occurring time and event type of the special event, is able to issue a signal to request the casino monitoring system to find out the monitor lens corresponding to the gambling apparatus according to the correlation table and send the instant monitoring images to the casino management system. Thereby, management personnel can instantly get the instant monitoring images of the special event and take suitable actions instantly.

The foregoing, as well as additional objects, features and advantages of the invention will be more readily apparent from the following detailed description, which proceeds with reference to the accompanying embodiments and drawings. The embodiments serve merely for illustrative purpose and are not the limitation of the invention.

DETAILED DESCRIPTION OF THE PREFERRED EMBODIMENTS

Figure 1:
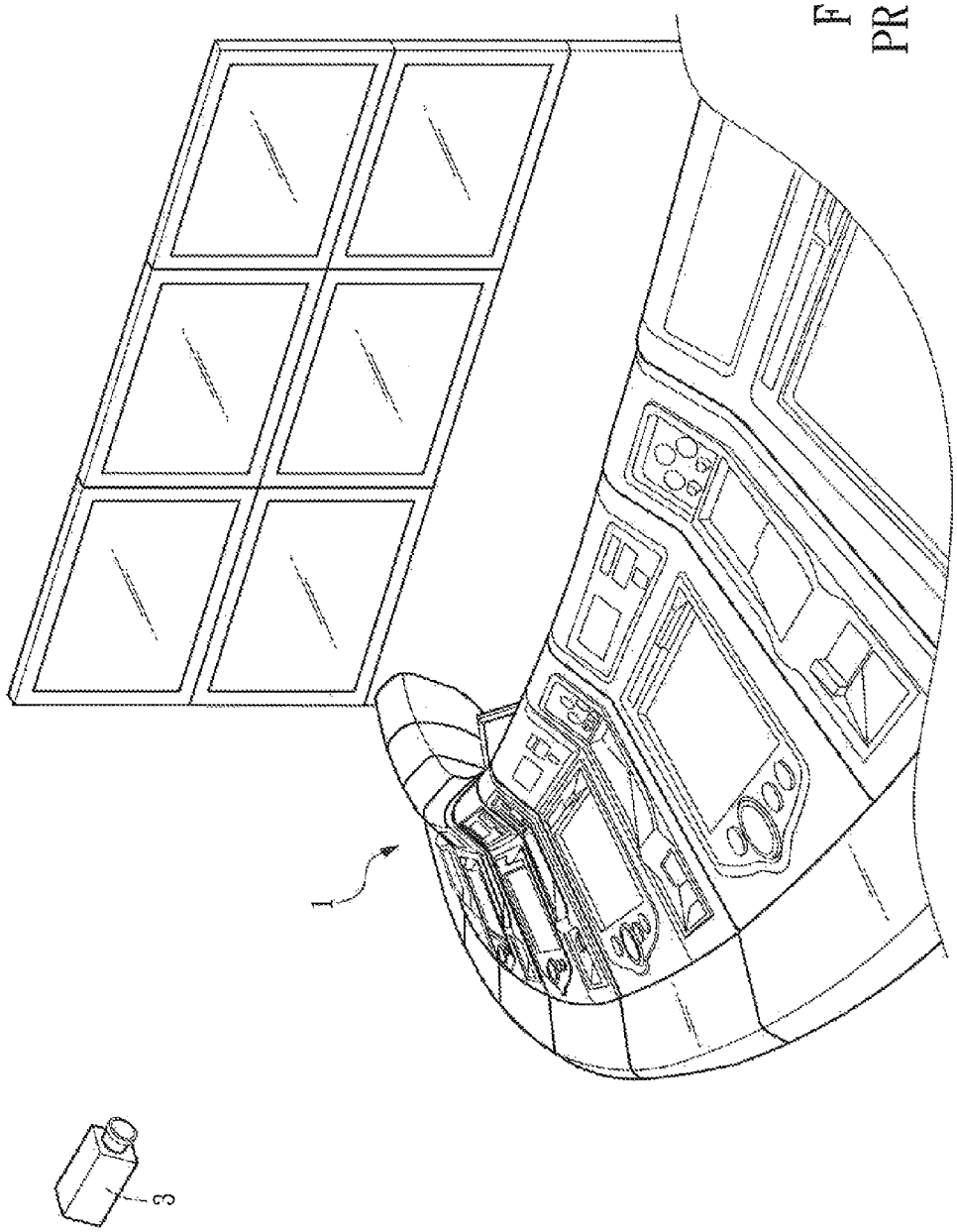
FIG. 1 is a schematic view of conventional gambling machines.
Figure 2:
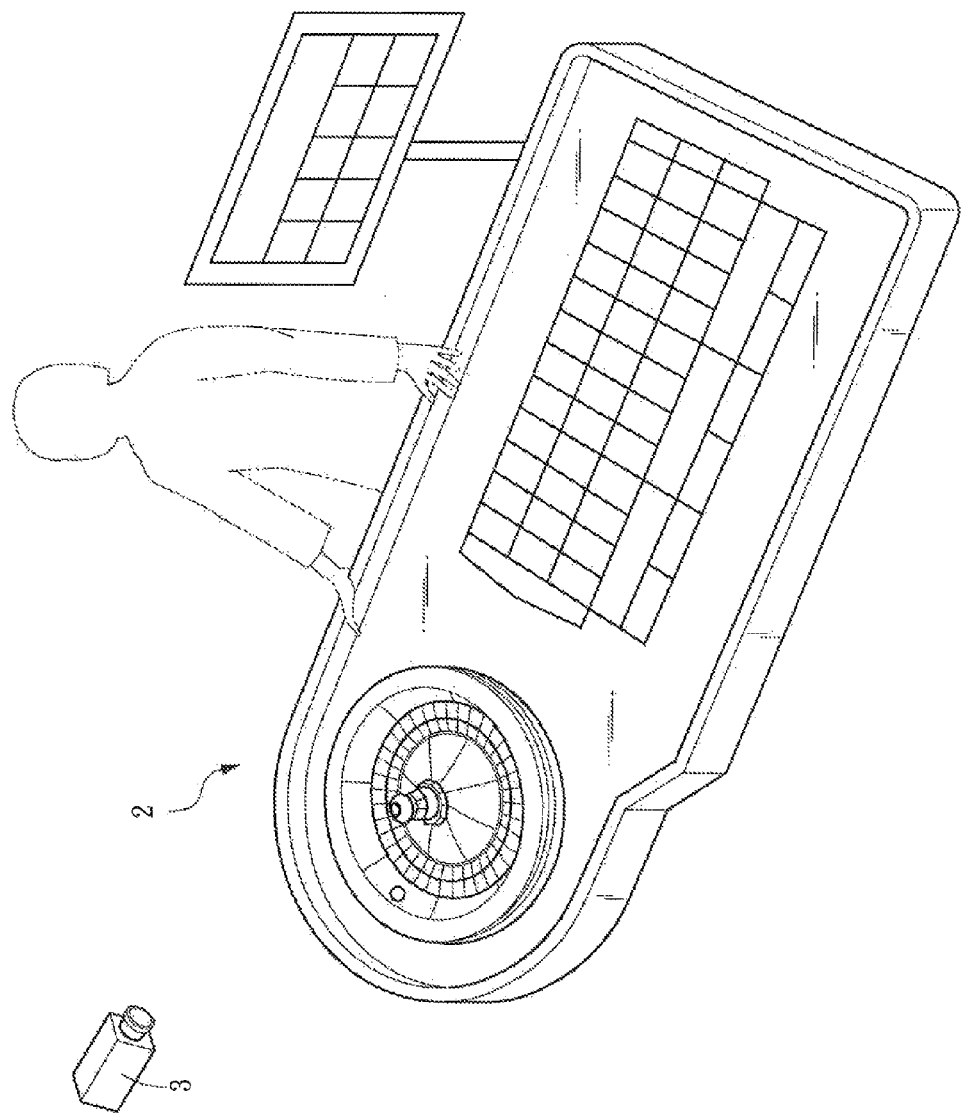
FIG. 2 is a schematic view of a conventional physical table top for gambling.
Figure 3:
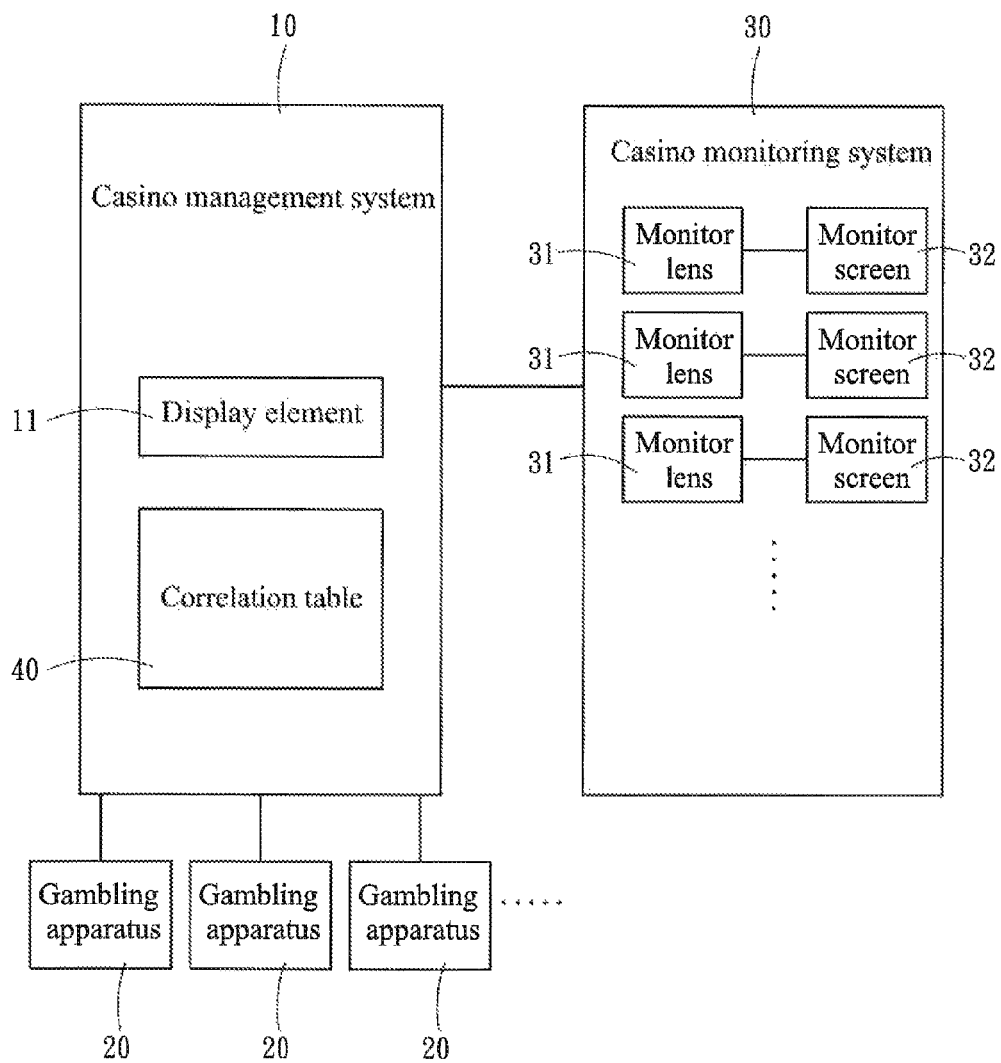
FIG. 3 is a block diagram of system architecture of the invention.

Please refer to FIG. 3 for a block diagram of system architecture of the invention implemented on a casino management system 10. The casino management system 10 is connected to at least one gambling apparatus 20 and a casino monitoring system 30. The gambling apparatus 20 can be a gambling machine or a physical table top. The casino monitoring system 30 includes at least one monitor lens 31 to monitor the at least one gambling apparatus 20. The casino management system 10 includes a correlation table 40.

The correlation table 40 registers the gambling apparatus 20 and the corresponding monitor lens 31. When a special event occurs on the gambling apparatus 20, the casino management system 10 generates an event record which includes a number of the gambling apparatus 20 and occurring time and event type of the special event. Then the casino management system 10 finds out the monitor lens 31 corresponding to the gambling apparatus 20 according to the correlation table 40, and issues a signal to request the casino monitoring system 30 to send instant monitoring images captured by the corresponding monitor lens 31 to the casino management system 10.

Figure 4A:
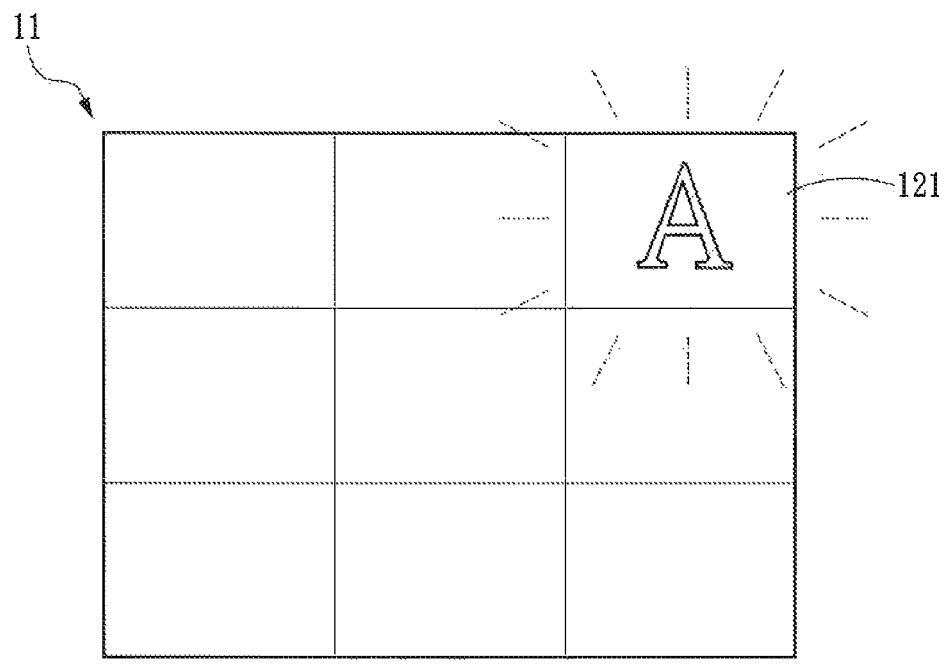
FIGS. 4A through 4C are schematic views of a display element of the invention in operating conditions.
Figure 4B:
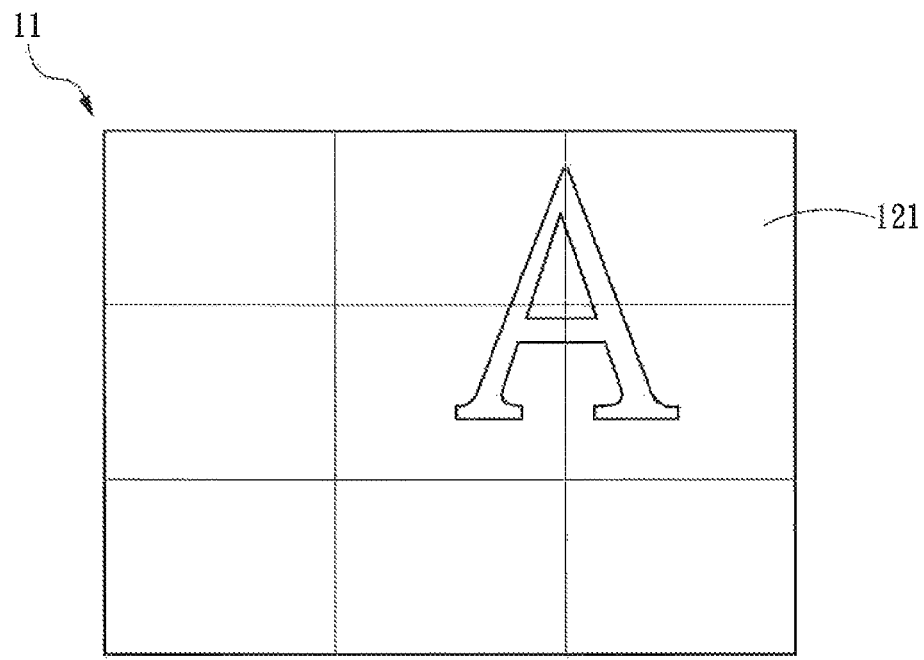
Figure 4C:
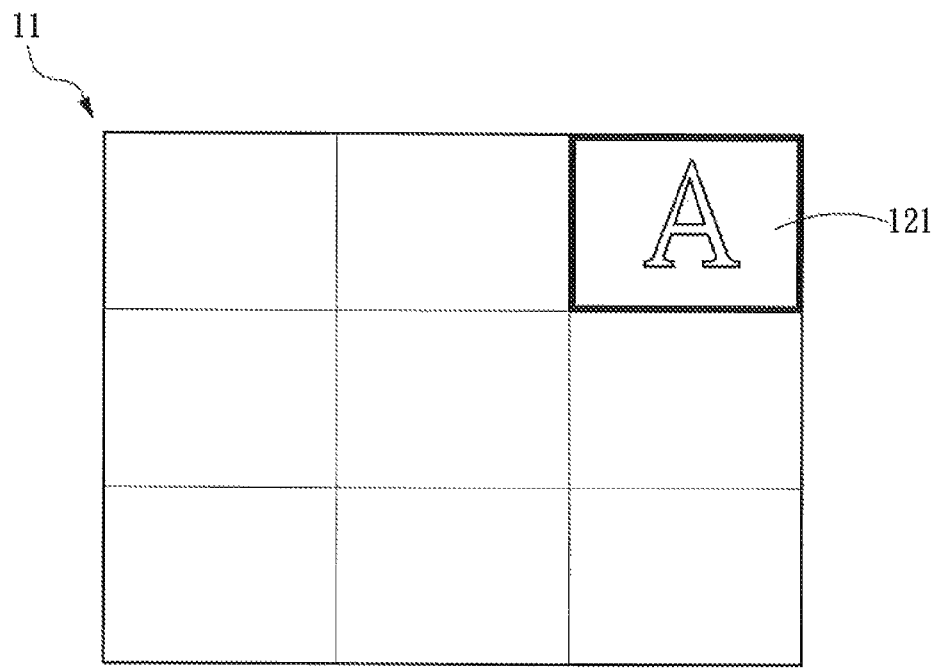

Please referring to FIGS. 4A through 4C, the casino management system 10 can include a display element 11 to instantly display the instant monitoring images of the monitor lens 31 corresponding to the special event while the special event occurs, so that management personnel can be fully informed of the special event. The display element 11 can include a plurality of split-screens 121 to respectively display the instant monitoring images of the monitor lens 31 so that the management personnel can see multiple instant monitoring images at the same time.

In order to notify the management personnel, the instant monitoring images of the special event displayed on one of the split-screens 121 can be displayed in a blinking fashion (referring to FIG. 4A), or the split-screens 121 can be combined to magnify and display the instant monitoring images of the special event (referring to FIG. 4B), or one of the split-screens 121 displays the instant monitoring images of the special event by a notable colored rim (referring to FIG. 4C).

In addition, the monitor lens 31 can have an automatic focusing element to automatically lock up and focus on the occurring place of the special event. The automatic focusing element can enlarge the image and automatically focus to provide clearer image data.

Figure 5A:
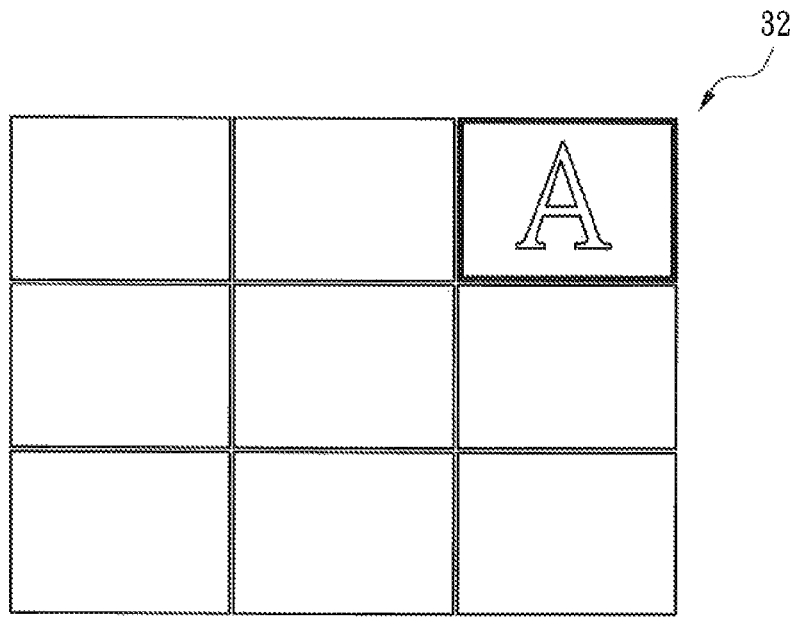
FIGS. 5A through 5C are schematic views of a monitor screen of the invention in operating conditions.
Figure 5B:
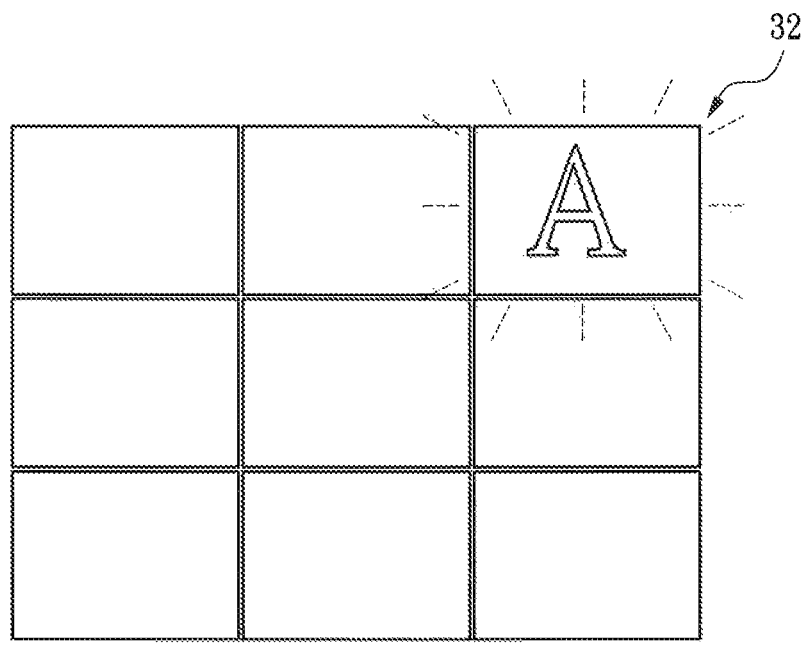
Figure 5C:
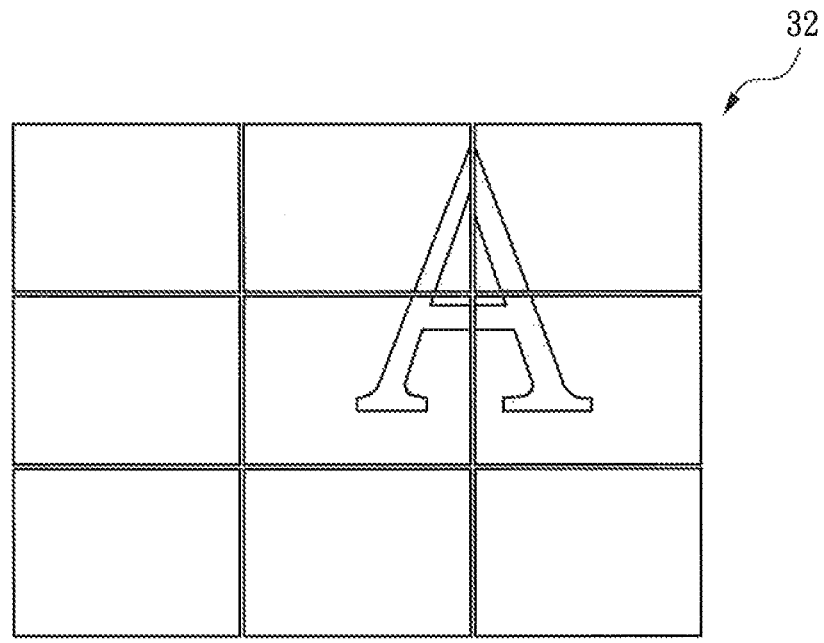

Please referring to FIGS. 5A through 5C, the casino monitoring system 30 can have at least one monitor screen 32 corresponding to the monitor lens 31. The monitor screen 32 generally is arranged as a TV wall in a juxtaposed manner and seen by security personnel for monitoring. The casino monitoring system 30, according to the signal request, can display the instant monitoring images of the monitor lens 31 corresponding to the special event on the monitor screen 32 in a special display effect, such as displaying the instant monitoring images by a notable colored rim (referring to FIG. 5A), or displaying the instant monitoring images by blinking (referring to FIG. 5B), or displaying the instant monitoring images by magnifying (referring to FIG. 5C).

Figure 6:
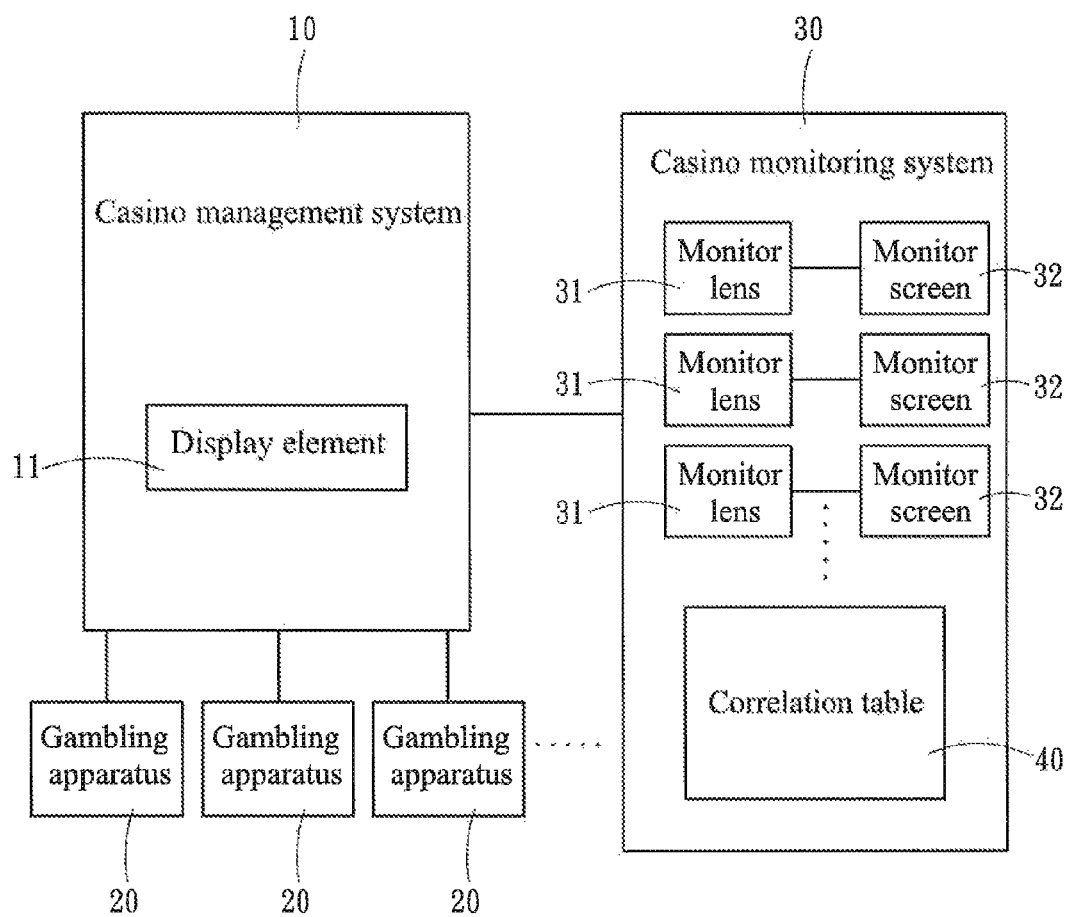
FIG. 6 is a block diagram of another system architecture of the invention.

Please refer to FIG. 6 for a block diagram of another system architecture of the invention implemented on a casino monitoring system 30. The casino monitoring system 30 is connected to a casino management system 10 to monitor at least one gambling apparatus 20 which also can be a gambling machine or a physical table top. The casino monitoring system 30 includes at least one monitor lens 31 to monitor the at least one gambling apparatus 20 and get the corresponding monitoring images, and a correlation table 40.

The correlation table 40 registers the gambling apparatus 20 and the corresponding monitor lens 31. When a special event occurs on the gambling apparatus 20, the casino management system 10 generates an event record which includes the number of the gambling apparatus 20 and occurring time and event type of the special event. Then the casino management system 10 issues a signal to request the casino monitoring system 30 to find out the monitor lens 31 corresponding to the gambling apparatus 20 according to the correlation table 40, and send the instant monitoring images captured by the corresponding monitor lens 31 to the casino management system 10.

As previously discussed, the casino management system 10 also can include a display element 11 to instantly display the instant monitoring images of the monitor lens 31 corresponding to the special event. Similarly, the monitor lens 31 can have an automatic focusing element to automatically lock up and focus on the occurring place of the special event.

As a conclusion, the invention can establish a correlation between the gambling apparatus and the corresponding monitor lens through the correlation table. Hence, when the special event occurs on the gambling apparatus, the casino management system, which records the number of the gambling apparatus and occurring time and event type of the special event, can issue a signal to request the casino monitoring system to find out the monitor lens corresponding to the gambling apparatus based on the correlation table, and send the instant monitoring images to the casino management system. Thereby management personnel can instantly get the instant monitoring images of the special event and take suitable actions immediately.

What is claimed is:

1. A casino management system connected to at least one gambling apparatus and a casino monitoring system which includes at least one monitor lens to monitor the at least one gambling apparatus, comprising:

a correlation table to register the gambling apparatus and the corresponding monitor lens, the casino management system generating an event record when a special event occurs on the gambling apparatus, the event record including a number of the gambling apparatus and occurring time and event type of the special event, the casino management system finding out the monitor lens corresponding to the gambling apparatus according to the correlation table and issuing a signal to request the casino monitoring system to send instant monitoring images captured by the monitor lens to the casino management system.

2. The casino management system of claim 1, wherein the gambling apparatus is a gambling machine or a physical table top.

3. The casino management system of claim 1 further including a display element to instantly display the instant monitoring images of the monitor lens corresponding to the special event while the special event occurs.

4. The casino management system of claim 3, wherein the display element includes a plurality of split-screens to display respectively the instant monitoring images of the monitor lens, one of the split-screens corresponding to the special event displaying the instant monitoring images of the monitor lens in a blinking fashion.

5. The casino management system of claim 4, wherein the split-screens are combined to magnify and display the instant monitoring images of the monitor lens corresponding to the special event while the special event occurs.

6. The casino management system of claim 4, wherein one of the split-screens corresponding to the special event displays the instant monitoring images of the monitor lens corresponding to the special event by a notable colored rim.

7. The casino management system of claim 1, wherein the monitor lens includes an automatic focusing element to automatically focus and lock up the occurring place of the special event.

8. The casino management system of claim 1, wherein the casino monitoring system includes at least one monitor screen corresponding to the monitor lens, the monitor screen corresponding to the special event displaying the instant monitoring images through a special display effect according to the signal request.

9. The casino management system of claim 8, wherein the special display effect is to display the instant monitoring images by a notable colored rim.

10. The casino management system of claim 8, wherein the special display effect is to display the instant monitoring images by blinking.

11. The casino management system of claim 8, wherein the special display effect is to display the instant monitoring images by magnifying.

12. A casino monitoring system connected to a casino management system to monitor at least one gambling apparatus, comprising:
   at least one monitor lens to monitor the at least one gambling apparatus; and
   a correlation table to register the gambling apparatus and the corresponding monitor lens, the casino management system generating an event record when a special event occurs on the gambling apparatus, the event record including a number of the gambling apparatus and occurring time and event type of the special event, the casino management system issuing a signal to request the casino monitoring system to find out the monitor lens corresponding to the gambling apparatus according to the correlation table and send instant monitoring images captured by the monitor lens to the casino management system.

13. The casino monitoring system of claim 12, wherein the gambling apparatus is a gambling machine or a physical table top.

14. The casino monitoring system of claim 12, wherein the casino management system includes a display element to instantly display the instant monitoring images of the monitor lens corresponding to the special event while the special event occurs.

15. The casino monitoring system of claim 14, wherein the display element includes a plurality of split-screens to display respectively the instant monitoring images of the monitor lens, one of the split-screens corresponding to the special event displaying the instant monitoring image of the monitor lens in a blinking fashion.

16. The casino monitoring system of claim 15, wherein the split-screens are combined to magnify and display the instant monitoring images of the monitor lens corresponding to the special event while the special event occurs.

17. The casino monitoring system of claim 15, wherein one of the split-screens corresponding to the special event displays the instant monitoring images of the monitor lens corresponding to the special event by a notable colored rim.

18. The casino monitoring system of claim 12, wherein the monitor lens includes an automatic focusing element to automatically focus and lock up the occurring place of the special event.

19. The casino monitoring system of claim 12 further including at least one monitor screen corresponding to the monitor lens, the monitor screen corresponding to the special event displaying the instant monitoring images through a special display effect according to the signal request.

20. The casino monitoring system of claim 19, wherein the special display effect is to display the instant monitoring images by a notable colored rim.

21. The casino monitoring system of claim 19, wherein the special display effect is to display the instant monitoring images by blinking.

22. The casino monitoring system of claim 19, wherein the special display effect is to display the instant monitoring images by magnifying.

* * * * *